US012578123B2

(12) United States Patent
Hu

(10) Patent No.: US 12,578,123 B2
(45) Date of Patent: Mar. 17, 2026

(54) SOLAR ENERGY UTILIZATION APPARATUS AND COMBINED STRUCTURE THEREOF

(71) Applicants: BOLYMEDIA HOLDINGS CO. LTD., Santa Clara, CA (US); Xiaoping Hu, Shenzhen (CN)

(72) Inventor: Xiaoping Hu, Shenzhen (CN)

(73) Assignees: BOLYMEDIA HOLDINGS CO. LTD., Santa Clara, CA (US); Xiaoping Hu, Shenzhen (CN)

( * ) Notice: Subject to any disclaimer, the term of this patent is extended or adjusted under 35 U.S.C. 154(b) by 55 days.

(21) Appl. No.: 18/559,803

(22) PCT Filed: May 14, 2021

(86) PCT No.: PCT/CN2021/093806
§ 371 (c)(1),
(2) Date: Nov. 9, 2023

(87) PCT Pub. No.: WO2022/236804
PCT Pub. Date: Nov. 17, 2022

(65) Prior Publication Data
US 2024/0240833 A1　　Jul. 18, 2024

(51) Int. Cl.
| *F24S 23/70* | (2018.01) |
| *F24S 20/20* | (2018.01) |
| *F24S 23/30* | (2018.01) |
| *H02S 40/22* | (2014.01) |

(52) U.S. Cl.
CPC ............... *F24S 23/70* (2018.05); *F24S 20/20* (2018.05); *F24S 23/30* (2018.05); *H02S 40/22* (2014.12); *F24S 2023/83* (2018.05)

(58) Field of Classification Search
CPC .. F24S 23/70; F24S 23/30; F24S 20/20; F24S 2023/83; H02S 40/22
See application file for complete search history.

(56) References Cited

U.S. PATENT DOCUMENTS

| 2010/0132753 | A1* | 6/2010 | Rosa ...................... | F24S 23/80 |
| | | | | 136/246 |
| 2017/0363270 | A1 | 12/2017 | Ramer et al. | |
| 2021/0265518 | A1* | 8/2021 | Temple ................... | F24S 23/70 |

FOREIGN PATENT DOCUMENTS

| CN | 110521111 A | 11/2019 |
| CN | 213072566 U | 4/2021 |

OTHER PUBLICATIONS

International Search Report of PCT Patent Application No. PCT/CN2021/093806 issued on Sep. 8, 2021.

* cited by examiner

*Primary Examiner* — Devina Pillay

(57) ABSTRACT

Disclosed are a solar energy utilization apparatus and a combined structure thereof. The solar energy utilization apparatus comprises a transparent top cover, a reflection groove and a light energy utilization unit. The transparent top cover is provided with a first transparent part recessed inward and a second transparent part protruding upward from the recess of the first transparent part; and based on such structure, sunlight reflected and refracted to the outer side of the transparent top cover can be re-refracted from other regions to the inner side of the transparent top cover, thereby improving the quantity of light refracted into the transparent top cover.

8 Claims, 4 Drawing Sheets

SOLAR ENERGY UTILIZATION APPARATUS AND COMBINED STRUCTURE THEREOF

TECHNICAL FIELD

The present disclosure relates to solar energy utilization devices.

BACKGROUND

Solar energy utilization devices are used for the recycling of solar energy, such as solar power generation through photovoltaic panels. With the decrease in cost and increase in efficiency of photovoltaic panels, solar energy utilization devices have been increasingly applied. However, the current low-power concentrating solar device can further improve the concentrating efficiency of solar energy.

SUMMARY

A new type of solar energy utilization apparatus and a combined structure thereof provided in the present disclosure to demonstrate a new solar energy utilization structure.

Based on the above objects, a solar energy utilization apparatus provided in an embodiment of the present disclosure may include a light energy utilization unit and a liquid light-condensing lens, wherein the liquid light-condensing lens may include:

a transparent top cover having a first transparent part recessed inward and a second transparent part protruding upwards from the recess of the first transparent part, and a reflection groove forming a chamber together with a transparent top cover, the chamber therein forming at least one liquid light-condensing cavity filled with a transparent liquid, and the reflection groove having a reflecting surface facing towards the transparent top cover to reflect sunlight;

the light energy utilization unit has a light energy utilization part capable of receiving, converting and utilizing the sunlight, and is arranged inside, outside the liquid light-condensing cavity or formed as a wall of the liquid light-condensing cavity to receive and utilize the sunlight;

the transparent top cover is made of a transparent material capable of refracting sunlight from outside to inside the liquid light-condensing cavity, and the liquid light-condensing cavity forms a structure capable of allowing at least part of the sunlight that is emitted from the transparent liquid to an inner wall of the liquid light-condensing cavity to form a total reflection phenomenon so as to concentrate the sunlight onto the light energy utilization part.

In an embodiment, the first transparent part is arranged on both sides of the second transparent part or arranged around the second transparent part.

In an embodiment, the first transparent part has a first transparent wall arranged obliquely, and the second transparent part is a convex structure with a small upper part and a large lower part.

In an embodiment, the transparent top cover and the reflection groove are surrounded integrally to form the closed liquid light-condensing cavity;

the light energy utilization unit is arranged on an inner wall of the reflection groove or forms as a part of the reflection groove, and the light energy utilization part is arranged towards the transparent liquid and the transparent top cover; or, the light energy utilization unit is arranged in the liquid light-condensing cavity, the light energy utilization part has a first light energy utilization part and a second light energy utilization part that are arranged oppositely, the first light energy utilization part is arranged towards the transparent top cover, the second light energy utilization part is arranged towards the reflection groove, and the first light energy utilization part and the second light energy utilization part are immersed in the transparent liquid.

In an embodiment, in the solar energy utilization apparatus, the chamber is divided into at least a liquid light-condensing cavity and at least an empty cavity by a transparent partition wall and/or the light energy utilization unit, so as to guide sunlight to the light energy utilization unit.

In an embodiment, the liquid light-condensing cavity comprises a middle liquid light-condensing cavity arranged at the second transparent part and at least a left liquid light-condensing cavity and at least a right liquid light-condensing cavity that are arranged at both sides of the middle liquid light-condensing cavity; at least an empty cavity is arranged below the middle liquid light-condensing cavity and arranged at the middle of the left liquid light-condensing cavity and the right liquid light-condensing cavity; the light energy utilization unit is arranged at an outer side of a bottom wall of the middle liquid light-condensing cavity or forms as the bottom wall of the middle liquid light-condensing cavity, and the light energy utilization part has a first light energy utilization part and a second light energy utilization part that are arranged oppositely, wherein the first light energy utilization part is arranged towards the middle liquid light-condensing cavity and the second light energy utilization part is arranged towards the empty cavity.

In an embodiment, the left liquid light-condensing cavity and the right liquid light-condensing cavity are arranged symmetrically relative to the middle liquid light-condensing cavity.

In an embodiment, the empty cavity is arranged below the second transparent part, and the light energy utilization unit is arranged below the empty cavity.

In an embodiment, there are two or more liquid light-condensing cavities, wherein some or all of the liquid light-condensing cavities are sealed and separated from each other, and the sealed and separated liquid light-condensing cavities are filled with a same or different transparent liquid respectively.

In an embodiment, the transparent top cover and the reflection groove are arranged in a barrel-shaped structure around a vertical centerline of the second transparent part.

In an embodiment, the transparent top cover and the reflection groove are of a revolving structure with a rotating centerline coincided with the vertical centerline of the second transparent part.

In an embodiment, the transparent top cover is roughly W-shaped in a vertical cross-section of the transparent top cover and the reflection groove, a middle convex region of the W-shaped corresponds to the second transparent part, and regions of both sides of the second transparent part correspond to the first transparent part.

In an embodiment, the reflection groove is roughly W-shaped in the vertical cross-section of the transparent top cover and the reflection groove, a middle convex part of the reflection groove is arranged corresponding to a middle convex part of the transparent top cover.

In an embodiment, the transparent top cover, the reflection groove and the liquid light-condensing cavity are strip shaped structures extending horizontally.

In an embodiment, the transparent top cover is roughly W-shaped in a vertical cross-section perpendicular to a direction in which the transparent top cover and the reflection groove are extended, a middle convex region of the W-shaped corresponds to the second transparent part, and regions of both sides of the second transparent part correspond to the first transparent part.

In an embodiment, the reflection groove is roughly W-shaped in the vertical cross-section perpendicular to the direction in which the transparent top cover and the reflection groove are extended, and a middle convex part of the reflection groove is arranged corresponding to a middle convex part of the transparent top cover.

In an embodiment, the transparent top cover, the reflection groove and the liquid light-condensing cavity are arranged symmetrically relative to a vertical centerline of the second transparent part in a vertical cross-section perpendicular to a direction in which the transparent top cover and the reflection groove are extended.

In an embodiment, the transparent top cover and the reflection groove form a biaxial symmetric structure.

Based on the above objects, a combined structure of the solar energy utilization apparatus provided in an embodiment may include a storage container and at least two solar energy utilization apparatus in any one of the embodiments mentioned above. The solar energy utilization apparatus may be placed flat inside the storage container in which a working medium is provided, wherein the working medium is in contact with the solar energy utilization apparatus for cooling the solar energy utilization apparatus and recycling heat emitted by the solar energy utilization apparatus.

With the solar energy utilization apparatus having a transparent top cover, a reflection groove and a light energy utilization unit according to the embodiments mentioned above, when concentrating, some sunlight may be reflected by the transparent top cover and sunlight inside the transparent top cover may also refracted to the outer side from the transparent top cover; moreover, based on a structure of the transparent top cover having a first transparent part recessed inward and a second transparent part protruding from the recess of the first transparent part, the sunlight reflected and refracted to the outer side of the transparent top cover can be re-refracted from other points to the inner side of the transparent top cover, thereby improving the quantity of light refracted into the transparent top cover. Furthermore, since at least one liquid light-condensing cavity is formed in the reflection groove and the transparent top cover, and a transparent liquid is filled in the liquid light-condensing cavity, the liquid light-condensing cavity can allow at least a part of sunlight emitted from the transparent liquid to the inner wall of the liquid light-condensing cavity to form a total reflection phenomenon, so that more sunlight can be converged on the light energy utilization unit, resulting in reduction of the sunlight refracted out of the apparatus from the liquid light-condensing cavity and the transparent top cover and improvement of the concentrating efficiency.

DETAILED DESCRIPTION

Figure 1:
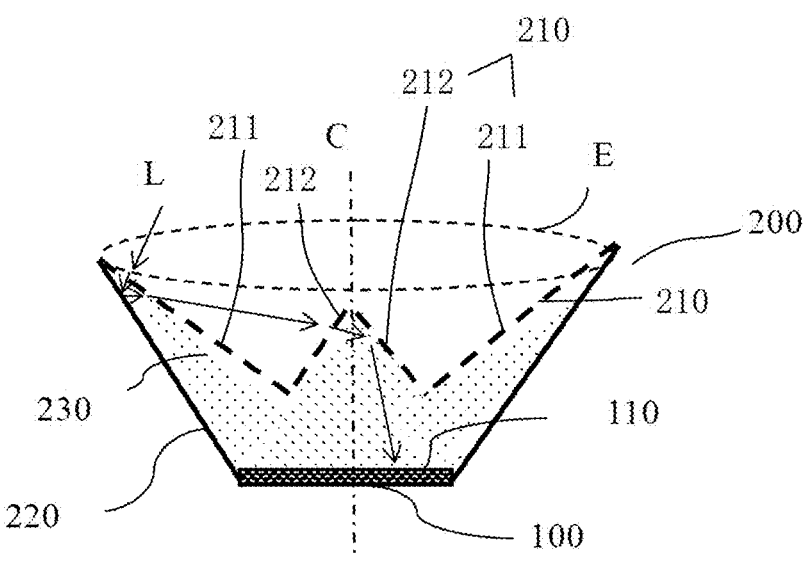
FIG. 1 is a schematic diagram of a vertical cross-section of a solar energy utilization apparatus in Example 1 of the present disclosure.

The present disclosure will be further described in detail below through specific embodiments with reference to the accompanying drawings. Common or similar elements are referenced with like or identical reference numerals in different embodiments. Many details described in the following embodiments are for better understanding the present disclosure. However, those skilled in the art can realize with minimal effort that some of these features can be omitted in different cases or be replaced by other elements, materials and methods. For clarity some operations related to the present disclosure are not shown or illustrated herein so as to prevent the core from being overwhelmed by excessive descriptions. For those skilled in the art, such operations are not necessary to be explained in detail, and they can fully understand the related operations according to the description in the specification and the general technical knowledge in the art.

In addition, the features, operations or characteristics described in the specification may be combined in any suitable manner to form various embodiments. At the same time, the steps or actions in the described method can also be sequentially changed or adjusted in a manner that can be apparent to those skilled in the art. Therefore, the various sequences in the specification and the drawings are only for the purpose of describing a particular embodiment, and are not intended to be an order of necessity, unless otherwise stated one of the sequences must be followed.

The serial numbers of components herein, such as "first", "second", etc., are only used to distinguish the described objects and do not have any order or technical meaning. The terms "connected", "coupled" and the like here include direct and indirect connections (coupling) unless otherwise specified.

A solar energy utilization apparatus provided in an embodiment of the present disclosure can be configured for receiving and utilizing sunlight for energy conversion, converting the sunlight into electrical, thermal and other forms of energy for use.

Please refer to FIGS. 1-5. The solar energy utilization apparatus may include a light energy utilization unit 100 and a liquid light-condensing lens 200. The liquid light-condensing lens 200 may include a transparent top cover 210 and a reflection groove 220. The light energy utilization unit 100 may have a light energy utilization part that is capable of receiving, converting and utilizing sunlight. The reflection groove 220 and the transparent top cover 210 may circle to form a chamber, which may be a sealed chamber, or an unsealed chamber. The chamber may therein form at least one liquid light-condensing cavity in which a transparent liquid 230 is filled.

In an embodiment, the light energy utilization part may be one or more of a photovoltaic panel, a photothermal utilization device, a photoelectric and thermal energy comprehensive utilization device, and a concentrated light energy utilization device. The photovoltaic panel may generally refer to any device that directly converts light energy into electrical energy, including various semiconductor photovoltaic panels, photovoltaic thin films, quantum dot optoelectronic converter devices, etc.. The light energy utilization part may be a single-sided light energy utilization part or a double-sided light energy utilization part. For example, the light energy utilization part may include a first light energy utilization part and a second light energy utilization part arranged in opposition.

Figure 2:
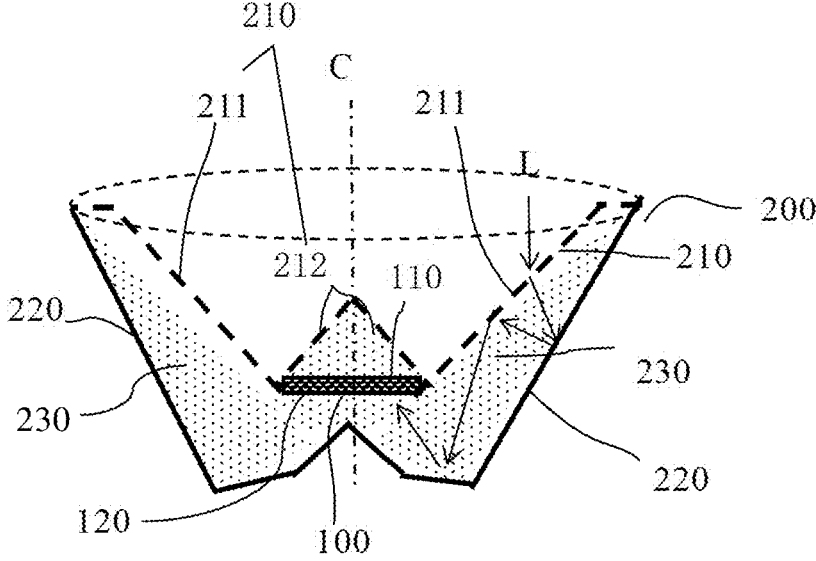
FIG. 2 is a schematic diagram of a vertical cross-section of a solar energy utilization apparatus in Example 2 of the present disclosure.
Figure 3:
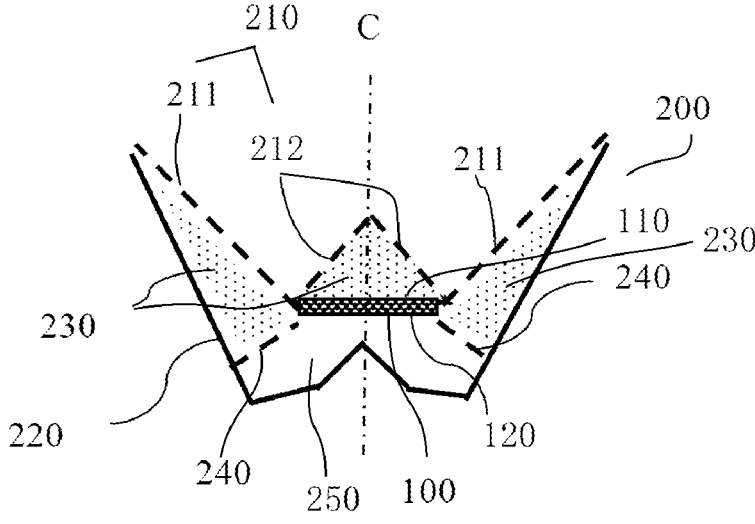
FIG. 3 is a schematic diagram of a vertical cross-section of a solar energy utilization apparatus in Example 3 of the present disclosure perpendicular to a direction in which the transparent top cover and the reflection groove are extended.
Figure 4:
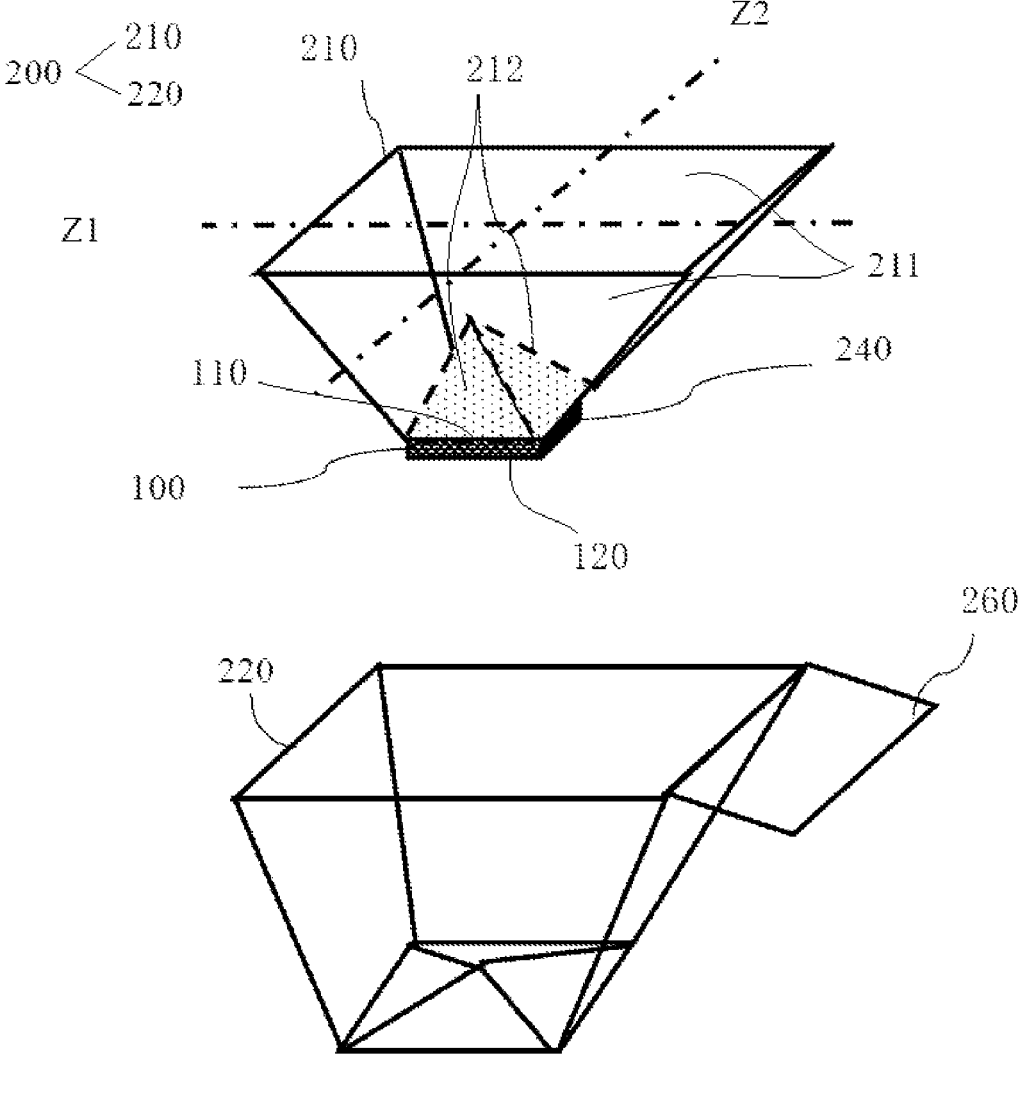
FIG. 4 is a schematic diagram of the separation of the transparent top cover and the reflection groove of the solar energy utilization apparatus in Example 4 of the present disclosure.

The transparent top cover 210 may be made of a transparent material that is capable of refracting sunlight from outside to inside to the liquid light-condensing cavity, allowing external sunlight to pass through the transparent top cover 210 to enter the interior of the apparatus. To concentrate more light and avoid too much sunlight being reflected off by the transparent top cover 210, as well as too much sunlight being reflected by the reflection groove 220 and refracted from the transparent top cover 210 to the outside, the transparent top cover 210 may be provided with a first transparent part 211 recessed inward and a second transparent part 212 protruding from the recess of the first transparent part 211. If necessary, the transparent top cover 210 may also include other structures, and be not limited to being composed of only the first transparent part 211 and the second transparent part 212. The first transparent part 211 may be in an inverted conical shape (as shown in FIGS. 1 and 2), a V-shaped shape (as shown in FIG. 3), an inverted pyramid shape (as shown in FIG. 4), a U-shaped shape, a cylindrical shape, or other concave shapes. The protruding second transparent part 212 may form a space with the recessed first transparent part 211, such that some sunlight reflected by the first transparent part 211 and the second transparent part 212, as well as sunlight refracted from the transparent top cover 210 to the outside under the reflection of the reflection groove 220, can be re-refracted from the first transparent part 211 and the second transparent part 212 into the apparatus, thereby increasing the quantity of light emitted to the transparent top cover 210 to reduce the quantity of sunlight that cannot enter the apparatus due to reflection or refraction.

Meanwhile, to better utilize the sunlight entering the apparatus, the light energy utilization unit 100 is arranged inside the liquid light-condensing cavity, outside the liquid light-condensing cavity, or formed as a wall of the liquid light-condensing cavity, so as to receive and utilize sunlight. The reflection groove 220 may have a reflecting surface facing towards the transparent top cover 210 to reflect sunlight. The reflecting surface can reflect sunlight onto objects such as the light energy utilization unit 100, the liquid light-condensing cavity, or an empty cavity described later, ultimately increasing the convergence of sunlight towards the light energy utilization unit 100. The design of the reflection groove 220 can concentrate sunlight from different angles of incidence towards the light energy utilization unit 100 through reflection, improving light concentrating efficiency.

The liquid light-condensing cavity may form a structure capable of allowing at least a part of the sunlight that is emitted from the transparent liquid 230 to an inner wall of the liquid light-condensing cavity to form a total reflection (also known as total internal reflection) phenomenon so as to concentrate the sunlight onto the light energy utilization part. That is, sunlight can be refracted from the transparent top cover 210 into the transparent liquid 230, and when it propagates in the transparent liquid 230, some sunlight may not be refracted from the wall of the liquid light-condensing cavity (e.g. the transparent top cover 210 or other portions), instead, it may be continue to propagate in the liquid light-condensing cavity and eventually converge onto the light energy utilization part under the effect of total reflection. A person skilled in the art may flexibly set the total reflection phenomenon according to a desired focusing effect; for example, the total reflection phenomenon may be achieved by designing the tilt angle and mutual angle of the transparent top cover 210, the reflection groove 220, and the walls of the liquid light-condensing cavity, respectively, and selecting the transparent liquid 230 with different refractive indices and the walls of the liquid light-condensing cavity.

In this embodiment, the concentration of sunlight may be increased with the design of the transparent top cover 210 and the reflection groove 220, and the total reflection phenomenon may be formed by using the transparent liquid 230 as a light propagation medium and the difference in refractive index between the transparent liquid 230 other media, allowing more sunlight to converge onto the light energy utilization part of the light energy utilization unit 100, thereby improving the efficiency of light concentrating. The design of the transparent top cover 210 shown in this embodiment can be flexibly combined with the total reflection phenomenon, especially when some sunlight in the liquid light-condensing cavity cannot form the total reflection phenomenon due to angles, and ultimately emits from the transparent top cover 210. At this time, the second transparent part 212 of the transparent top cover 210 can concentrate some sunlight emitted back into the liquid light-condensing cavity, greatly improving the utilization of sunlight.

In an embodiment, the top of the second transparent part 212 may be lower than the top of the first transparent part 211, thereby avoiding the second transparent part 212 from blocking sunlight emitted from some angles from shining on the first transparent part 211.

In an embodiment, the transparent liquid 230 may be pure water (water), antifreeze liquid (a mixture of water and ethylene glycol), or other environmentally friendly transparent liquid 230 (such as a mixture of water and glycerol). In addition, the transparent liquid 230 can directly or indirectly form a heat transfer structure with the light energy utilization part, thereby cooling or absorbing heat to the light energy utilization part and improving the utilization of light energy.

Furthermore, in order to expand the concentrating area, the first transparent part 211 is arranged on both sides of the second transparent part 212 or around the second transparent part 212 in an embodiment. In this embodiment, different sides of the first transparent part 211 can realize reflection and refraction with corresponding second transparent part 212, absorbing more sunlight. Of course, in some other embodiments, the first transparent part 211 may also be arranged only on one side of the second transparent part 212.

In an embodiment, the first transparent part 211 may have a first transparent wall arranged obliquely, and the second transparent part 212 may be of a convex structure with a small upper part and a large lower part. As shown in FIGS. 1-5, the outer end of the tilted first transparent wall is further away from the second transparent part 212 compared to its inner end from the part 212, which can form an opening shape with a larger outer diameter and a smaller inner diameter on the transparent top cover 210, allowing more sunlight to shine on the first transparent part 211 and the second transparent part 212.

Further, in some embodiments, the reflection groove 220 and the transparent top cover 210 forming therein at least one liquid light-condensing cavity may include that: the reflection groove 220 and the transparent top cover 210 may enclose integrally to form a closed liquid light-condensing cavity; or, the chamber may be divided into at least a liquid light-condensing cavity (containing the transparent liquid 230) and at least an empty cavity 250 by a transparent partition wall 240 and/or the light energy utilization unit 100. The transparent partition wall 240 and the light energy utilization unit 100 may also be replaced by other structures. The liquid light-condensing cavity and the empty cavity 250 may be configured to direct sunlight to the light energy utilization unit 100. When forming the chamber by the reflection groove 220 and the transparent top cover 210, a desired structure of the chamber may be formed by only simply splicing the two components, or by the two components together with other structures.

For a liquid light-condensing device, there may be many factors to consider, such as refractive index (which determines the total reflection angle and reflection waste), freezing point, and cost. When there are more than two liquid light-condensing cavities, some or all of them are sealed and separated from each other, and the sealed and separated liquid light-condensing cavities may be filled with the same or different transparent liquid 230 respectively. This design allows for the independent selection of various transparent liquids 230 in different liquid light-condensing cavities based on needs (such as cost-effectiveness).

When there are more than two liquid light-condensing cavities, some or all of them may be symmetrically or asymmetrically structured, which can be flexibly selected based on a desired concentrating effect.

A combination of the liquid light-condensing cavity and the empty cavity 250 is chosen in some embodiments to concentrate sunlight. The advantage thereof is that: firstly, the travel of light in water which has light absorption characteristics can be reduced by using the empty cavity 250 to replace some liquid light-condensing cavities, thereby reducing the loss of light; secondly, sunlight can be directed in a favorable direction by more refractive positions designed inside the reflection groove 220 and the transparent top cover 210 by using different refractive indices between air and water inside the empty cavity 250, thereby achieving better concentrating performance. The empty cavity 250 may be filled with gas or pumped into a vacuum state. The empty cavity 250 may be sealed or be connected to the external environment.

In order to facilitate cleaning, a transparent dust cover may also be installed at the top of the apparatus in this embodiment.

Based on the above inventive concept, several different embodiments are further described below to better illustrate the inventive concept.

Example 1

Please refer to FIG. 1. A solar energy utilization apparatus provided in this embodiment may include a light energy utilization unit 100 and a liquid light-condensing lens 200. The liquid light-condensing lens 200 may include a transparent top cover 210 and a reflection groove 220. The transparent top cover 210 and the reflection groove 220 are of a closed structure and form a closed chamber which is served as an overall liquid light-condensing cavity filled with a transparent liquid 230. The light energy utilization unit 100 may be arranged at the inner wall of the reflection groove 220 or formed as a part of the reflection groove 220, and the light energy utilization part (e.g. the first light energy utilization part 110) may be faced toward the transparent liquid 230 and the transparent top cover 210 such that the sunlight reflected by the reflection groove 220 and passed through the transparent liquid 230 can act on the light energy utilization unit 100.

Further, in this embodiment, the transparent top cover 210 and the reflection groove 220 of the liquid light-condensing lens 200 may be arranged in a barrel-shaped structure around the vertical centerline of the second transparent part 212. The barrel-shaped structure may have a barrel-like outline with a vertical centerline C of the second transparent part 212 as an axis and closed or semi-closed at the top and bottom. The top wall, side wall, and bottom wall of the barrel-shaped structure may be shaped as needed, such as the shape of the transparent top cover 210 (top wall) and the reflection groove 220 (side wall) shown in FIG. 1. The barrel-shaped structure may include a revolving structure (as shown in FIG. 1) with the vertical centerline C of the second transparent part 212 as a rotating centerline (i.e. its axis) and a deformed structure similar to the revolving structure.

The vertical and horizontal directions mentioned in this embodiment and other embodiments are based on the direction of the illustration. Due to the possible adjustment of the direction of the solar energy utilization apparatus based on terrains and latitudes and longitudes during actual applications, the direction of the illustration may be different from an actual placement position of the solar energy utilization apparatus during an actual application.

Referring to FIG. 1, taking the liquid light-condensing lens 200 being the revolving structure as an example, in any vertical section of the transparent top cover 210 and the reflection groove 220 (i.e. the section cut by a vertical plane passing through the vertical centerline C of the second transparent part 212), the transparent top cover is approximately W-shaped, where the W-shaped central raised region is the second transparent part 212, and the region of the two sides of the second transparent part 212 is the first transparent part 211. FIG. 1 does not directly show the three-dimensional view of the revolving structure. The revolving structure can be obtained by rotating the illustrated vertical section around the vertical centerline C of the second transparent part 212 along the elliptical dashed line E. The path of the vertical section should be a circle centered on the vertical center line C of the second transparent part 212, which is drawn as an ellipse here due to perspective relation. After rotating the W-shaped transparent top cover 210, a second transparent part 212 in the shape of a conical protrusion and a first transparent part 211 in the shape of an inverted circular truncated cone are finally formed, the second transparent part 212 being located in the middle of the first transparent part 211. Of course, in the vertical section of the transparent top cover 210 and the reflection groove 220, the transparent top cover 210 is not limited to be W-shaped, but can also be other shapes, such as "concave" shape, inverted epsilon-typed shape and wavy shape. In this vertical section, the transparent top cover 210 may be composed of four folds. In other embodiments, the transparent top cover 210 can also be composed of more folds, or several curved surfaces or Fresnel lens teeth surfaces.

Further, referring to FIG. 1, in this embodiment, the light energy utilization unit 100 is arranged at the bottom of the reflection groove 220 which may be formed in a shape such as but not limited to a U shape, a V shape, or a similar shape, so as to better direct sunlight onto the light energy utilization unit 100.

In some embodiments, in the vertical section of the transparent top cover 210 and the reflection groove 220, the reflection groove may also be W-shaped, and the middle raised portion of the reflection groove 220 is arranged correspondingly to the middle raised portion of the transparent top cover 210.

FIG. 1 shows a process in which incident light L is refracted through the first transparent part 211 of the transparent top cover 210, reflected by the reflection groove 220, refracted from the first transparent part 211 of the transparent top cover 210 to the outside, refracted by the second transparent part 212 of the transparent top cover 210 to the liquid light-condensing cavity to form total reflection, and finally concentrated onto the light energy utilization part of the light energy utilization unit 100. This embodiment makes full use of the total reflection of the transparent liquid 230 in the transparent top cover 210 to achieve light concentration. Meanwhile, the transparent liquid 230 may also be used to cool or absorb heat from the light energy utilization unit 100, improving the utilization of light energy of the light energy utilization unit 100. In other words, the transparent top cover 210 may have two functions at the same time: first transmitting incident light from the outside through one surface, and then totally reflecting light from the transparent liquid 230 through one surface.

Example 2

Referring to FIG. 2, a solar energy utilization apparatus disclosed in this embodiment may include a light energy utilization unit 100 and a liquid light-condensing lens 200. The liquid light-condensing lens 200 may include a transparent top cover 210 and a reflection groove 220, which are closed structures that enclose a closed chamber. The chamber may serve as a single liquid light-condensing cavity, which is filled with a transparent liquid 230. The light energy utilization unit 100 may be arranged inside the liquid light-condensing cavity, and the light energy utilization part may have a first light energy utilization part 110 and a second light energy utilization part 120 that are arranged oppositely. The first light energy utilization part 110 may be disposed facing the transparent top cover 210, and the second light energy utilization part 120 may be disposed facing the bottom of the reflection groove 220. Both the first light energy utilization part 110 and the second light energy utilization part 120 may be immersed in the transparent liquid 230, so that sunlight reflected by the reflection groove 220 and passed through the transparent liquid 230 can act on the opposite first light energy utilization part 110 and second light energy utilization part 120.

In another embodiment, the light energy utilization unit 100 may be arranged in a chamber surrounded by the transparent top cover 210 and the reflection groove 220, which may also be sealed and fitted with the second transparent part 212, thereby dividing the chamber into two or more liquid light-condensing cavities. For example, in FIG. 2, the liquid light-condensing cavity facing the first light energy utilization part 110 and the liquid light-condensing cavity facing the second light energy utilization part 120 are two sealed and separated cavities, which can be filled with the same or different transparent liquids 230.

Similar to Example 1, in this example, the transparent top cover 210 and the reflection groove 220 may also surround the vertical centerline C of the second transparent part 212 to be in a barrel-shaped structure. The barrel-shaped structure may be a structure with a vertical centerline C of the second transparent part 212 as an axis, closed or semi-closed top and bottom, and a barrel-like outline. The top wall, side wall, and bottom wall of the barrel-shaped structure may be adjusted to other shapes as needed, such as the shape of the transparent top cover 210 (top wall) and the reflection groove 220 (side wall and bottom wall) shown in FIG. 2. The barrel-shaped structure may include a revolving structure (as shown in FIG. 1) with the vertical centerline C of the second transparent part 212 as the rotating centerline (i.e., its axis), and a deformed structure similar to the revolving structure.

Specifically, referring to FIG. 2, taking the liquid light-condensing lens 200 being the revolving structure as an example, in any vertical section of the transparent top cover 210 and the reflection groove 220 (i.e., the section cut by a vertical plane passing through the vertical centerline C of the second transparent part 212), the transparent top cover 210 is roughly W-shaped, where the middle raised region of the W-shaped is the second transparent part 212, and the region of both sides of the second transparent part 212 is the first transparent part 211. FIG. 2 does not directly show the three-dimensional view of the revolving structure. The revolving structure can be obtained by rotating the illustrated vertical section around the vertical centerline C of the second transparent part 212 along the elliptical dashed line E. The path of the vertical section should be a circle centered on the vertical center line C of the second transparent part 212, which is drawn as an ellipse here due to perspective relation. After rotating the W-shaped transparent top cover 210, a second transparent part 212 in the shape of a conical protrusion and a first transparent part 211 in the shape of an inverted circular truncated cone are finally formed, the second transparent part 212 being located in the middle of the first transparent part 211. Of course, in the vertical section of the transparent top cover 210 and the reflection groove 220, the transparent top cover 210 is not limited to be W-shaped, but can also be other shapes, such as "concave" shape, inverted epsilon-typed shape and wavy shape. In this vertical section, the transparent top cover 210 may be composed of six folds. In other embodiments, the transparent top cover 210 can also be composed of more or less folds, or several curved surfaces or Fresnel lens teeth surfaces.

Further, referring to FIG. 2, in the vertical section of the transparent top cover 210 and the reflection groove 220, the reflection groove 220 is also roughly W-shaped, and the middle raised portion of the reflection groove 220 is arranged correspondingly to the middle raised portion of the transparent top cover 210. In some embodiments, the light energy utilization unit 100 may also be arranged at the bottom of the reflection groove 220. The reflection groove 220 can also be formed in a shape, such as but not limited to, U-shaped, V-shaped, or similar shape, to better guide the sunlight to converge on the light energy utilization unit 100.

FIG. 2 shows a process of incident light L at a certain angle being refracted by the transparent top cover 210, reflected by the reflection groove 220, totally reflected by the liquid light-condensing lens 200, and then reflected by the reflection groove 220 to the double-sided second light energy utilization part 120 of the light energy utilization unit 100.

Example 3

Referring to FIG. 3, a solar energy utilization apparatus disclosed in this embodiment may include a light energy utilization unit 100 and a liquid light-condensing lens 200. The liquid light-condensing lens 200 may include a transparent top cover 210 and a reflection groove 220, which are enclosed structures that enclose a closed chamber.

The liquid light-condensing lens 200 may be a strip-shaped structure. FIG. 3 shows a vertical section perpendicular to a direction in which the transparent top cover 210 and the reflection groove 220 are extended, that is extending in the direction perpendicular to the paper with the vertical section shown in FIG. 3. As such, the three-dimensional structure of the liquid light-condensing lens 200 can be obtained. In the liquid light-condensing lens 200, the chamber is divided into at least one liquid light-condensing cavity (a part with the transparent liquid 230) and at least one empty cavity 250 by the transparent partition wall 240 and/or the light energy utilization unit 100, and the liquid light-condensing cavity is filled with the transparent liquid 230. This structure can also be applied to Example 1 and Example 2. The liquid light-condensing cavity and the empty cavity 250 are used to guide sunlight to the light energy utilization unit 100.

Specifically, in the embodiment shown in FIG. 3, the chamber is divided into three liquid light-condensing cavities and one empty cavity 250 by two transparent partition walls 240 and the light energy utilization unit 100. The liquid light-condensing cavities may include a middle liquid light-condensing cavity arranged at the second transparent part 212 and a left liquid light-condensing cavity and a right liquid light-condensing cavity arranged at both sides of the middle liquid light-condensing cavity. The empty cavity 250 may be arranged below the middle liquid light-condensing cavity and in the middle of the left and right liquid light-condensing cavities. The light energy utilization unit 100 may be arranged on the outside of the bottom wall of the middle liquid light-condensing cavity, or formed as the bottom wall of the middle liquid light-condensing cavity. The light energy utilization part may have a first light energy utilization part 110 and a second light energy utilization part 120 that are arranged opposite each other. The first light energy utilization part 110 is arranged towards the middle liquid light-condensing cavity, and the second light energy utilization part 120 is arranged towards the empty cavity 250. In FIG. 3, the middle liquid light-condensing cavity, the left liquid light-condensing cavity, the right liquid light-condensing cavity and the empty cavity 250 are all one. In other embodiments, these cavities may be more than one according to the effect of total reflection and requirements for light concentration.

The liquid light-condensing lens 200 may be of a striped symmetrical structure or a striped asymmetrical structure. On a vertical section perpendicular to the direction in which the transparent top cover 210 and the reflection groove 220 are extended, the transparent top cover 210, the reflection groove 220, the light energy utilization unit 100, the liquid light-condensing cavity and the empty cavity 250 can be provided in symmetrical or asymmetrical structures.

Referring to FIG. 3, taking the symmetrical structure as an example, on the vertical section perpendicular to direction in which the transparent top cover 210 and the reflection groove 220 are extended, the left liquid light-condensing cavity and the right liquid light-condensing cavity are symmetrically arranged relative to the middle liquid light-condensing cavity which itself also is of a symmetrical structure with the vertical centerline C of the middle liquid light-condensing cavity as the axis of symmetry. This symmetrical structure can better concentrate sunlight onto the light energy utilization unit 100.

In this embodiment, more refractive structures can be provided inside the chamber of the liquid light-condensing lens 200 by the transparent partition wall 240 to better control and guide the sunlight in the chamber of the liquid light-condensing lens 200, so as to be transferred to a desired direction, and ultimately improve the quantity of light emitted onto the light energy utilization unit 100. In addition to helping to form more refractive structures in the liquid light-condensing lens 200, the empty cavity can also reduce the travel of light in water, thereby reducing light loss. At the same time, in this embodiment, the second light energy utilization part 120 of the light energy utilization unit 100 is no longer immersed in the transparent liquid 230, which not only improves the safety of the product, but also makes the assembly and manufacturing of the light energy utilization unit 100 and the liquid light-condensing lens 200 simpler and more convenient without the influence of the transparent liquid 230.

In other embodiments, the transparent partition wall may also be used to separate the transparent liquid in a different area from the area shown in FIG. 3. In doing so, the light energy utilization unit 100 can also be prevented from being immersed in the transparent liquid 230. In a case where there are more than two liquid light-condensing cavities, some or all of the liquid light-condensing cavities are sealed and separated from each other, and the sealed and separated liquid light-condensing cavities are filled with the same or different transparent liquids 230.

Example 4

Referring to FIG. 4, a solar energy utilization apparatus including a light energy utilization unit 100 and a liquid light-condensing lens 200 is disclosed in this embodiment. The liquid light-condensing lens 200 includes a transparent top cover 210 and a reflection groove 220.

Please refer to FIG. 4, which shows a schematic diagram of the transparent top cover 210 and the reflection groove 220 in a disassembled state. The transparent top cover 210 and the reflection groove 220 can form a closed structure after being combined, enclosing a closed (or semi-closed) chamber. The chamber can be used as a single liquid light-condensing cavity, or it can be divided into multiple liquid light-condensing cavities and empty cavities as shown in Example 3. The light energy utilization unit 100 is arranged below the transparent top cover 210 and immersed in the transparent liquid 230. The light energy utilization unit 100 has a first light energy utilization part 110 and a second light energy utilization part 120. The first light energy utilization part 110 is disposed towards the transparent top cover 210, and the second light energy utilization part 120 is disposed towards the reflection groove 220. The reflection groove 220 is usually opaque, and in order to show the three-dimensional structure at the bottom thereof, the reflection groove 220 is drawn transparently in FIG. 4.

The liquid light-condensing lens 200 in this embodiment is a biaxial symmetric structure, that is, it has two symmetrical axes (such as Z1 and Z2 in FIG. 4). Symmetrical vertical sections can be obtained by cutting vertically along either of these two axes, and these two different vertical sections can be the same or different.

Referring to FIG. 4, in this embodiment, the first transparent part 211 of the transparent top cover 210 is roughly in the shape of an inverted quadrangular pyramid, and the second transparent part 212 is in the shape of a quadrangular pyramid, which is located in the recess of the first transparent part 211. The reflection groove 220 can also be provided with side groove walls in the shape of inverted quadrangular pyramids and bottom groove walls roughly in the shape of quadrangular pyramids. After the transparent top cover 210 and the reflection groove 220 are assembled, a vertical section is obtained by cutting along the Z1 and Z2 axes, which is roughly the same as the vertical section shown in FIG. 2, which can be used as a reference. Of course, under the condition of conforming to the biaxial symmetrical structure, the transparent top cover 210 and the reflection groove 220 can also be configured to other shapes other than FIG. 4.

Further, please continue to refer to FIG. 4. In this embodiment, the bottom wall of the first transparent part 211 is enclosed by a transparent partition wall (which can also be replaced by the light energy utilization unit 100) to form a closed tetrahedral structure, forming an independent liquid light-condensing cavity. The transparent liquid 230 in the liquid light-condensing cavity is separated from other transparent liquid 230. This has two benefits. Firstly, the first light energy utilization part 110 of the light energy utilization unit 100 is attached to the transparent partition wall, which can be immersed in the transparent liquid 230, facilitating processing and assembly. Secondly, different transparent liquids can be used for the transparent liquid 230 in the tetrahedral structure, improving the selectivity of the transparent liquid 230.

Further, referring to FIG. 4, in one embodiment, at least one side of the transparent top cover 210 is also provided with a hanger 260 (which is made of transparent or non-transparent material) for installing the solar energy utilization apparatus, such as hanging the entire solar energy utilization apparatus on other objects or another solar energy utilization apparatus by using the hanger 260.

Example 5

Figure 5:
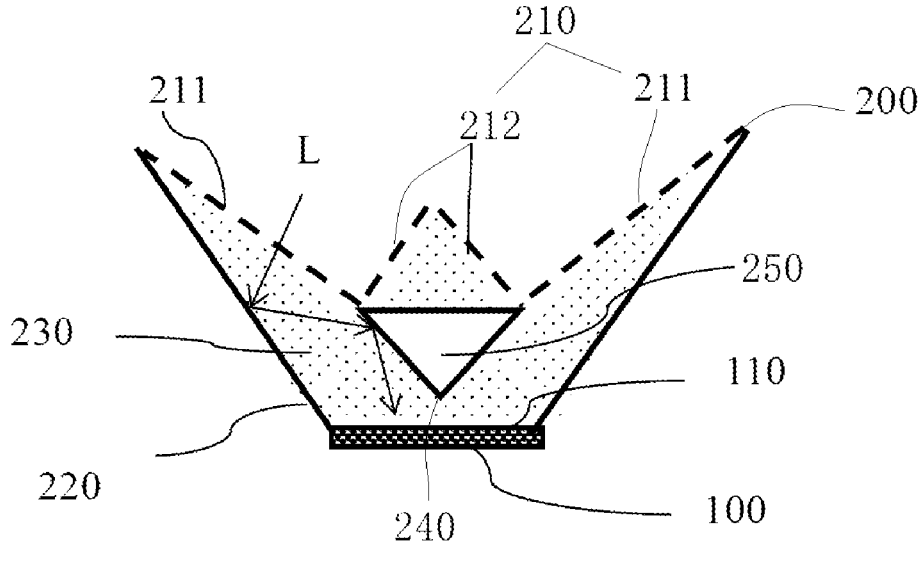
FIG. 5 is a schematic diagram of a vertical cross-section of a solar energy utilization apparatus in Example 5 of the present disclosure.

Referring to FIG. 5, a solar energy utilization apparatus disclosed in this embodiment may include a light energy utilization unit 100 and a liquid light-condensing lens 200. The liquid light-condensing lens 200 includes a transparent top cover 210 and a reflection groove 220. The transparent top cover 210 and the reflection groove 220 are closed structures, enclosing a closed chamber. The light energy utilization unit 100 is disposed on the inner wall of the reflection groove 220 or forms part of the reflection groove 220, and the light energy utilization part (such as the first light energy utilization part 110) is disposed facing the transparent liquid 230 and the transparent top cover 210.

Referring to FIG. 5, similar to Example 3, in this example, at least one liquid light-condensing cavity and at least one empty cavity 250 are formed in the chamber formed by the transparent top cover 210 and the reflection groove 220 by means of a transparent partition wall 240 to guide sunlight to the light energy utilization unit 100.

In the embodiment shown in FIG. 5, there is one liquid light-condensing cavity, and the empty cavity 250 is located in the middle of the liquid light-condensing cavity. The liquid light-condensing cavity and the empty cavity 250 cooperate to form total reflection throughout the chamber of the liquid light-condensing lens 200, thereby guiding more sunlight to concentrate onto the light energy utilization unit 100.

In some embodiments, the wall (e.g., the top wall) of the empty cavity 250 can also form a closed liquid light-condensing cavity with the second transparent part 212 to fill with different types of transparent liquids 230 from other parts.

In this embodiment, the liquid light-condensing lens 200 may be either a barrel-shaped structure similar to that in Example 1 or Example 2, or a strip-shaped structure similar to that in Example 3. When the liquid light-condensing lens 200 is a barrel-shaped structure, the graph shown in FIG. 5 is a vertical section of the transparent top cover 210 and the reflection groove 220. When the liquid light-condensing lens 200 is a strip-shaped structure, the graph shown in FIG. 5 is a vertical section perpendicular to the direction in which the transparent top cover 210 and the reflection groove 220 are extended.

In the vertical section shown in FIG. 5, the empty cavity 250 is a transparent hollow bag in the shape of an inverted triangle. The transparent hollow bag can be filled with gas or vacuum. The transparent hollow bag can be sealed or connected to the outside world. The two side walls of the inverted triangular cavity 250 are paired with corresponding parts of the reflection groove 220 to achieve total reflection. The two side walls can be in the shape of a plane, a curved surface, or a folded surface. In addition to the shape shown in FIG. 5, other shapes such as inverted terrace, inverted cone, inverted cone-shaped, etc. can also be used for the vertical section of the empty cavity 250

In the vertical section shown in FIG. 5, the empty cavity 250 is arranged directly below the second transparent part 212, and the light energy utilization unit 100 is arranged directly below the cavity 250.

FIG. 5 shows a process of incident light L refracted by the liquid light-condensing lens 200, reflected by the reflection groove 220, and then being totally reflected by the wall of the empty cavity 250. With the empty cavity 250 shown in this embodiment, the incident angle of light entering the light energy utilization unit 100 can be improved, together with increase of the condensation ratio.

Example 6

Figure 6:
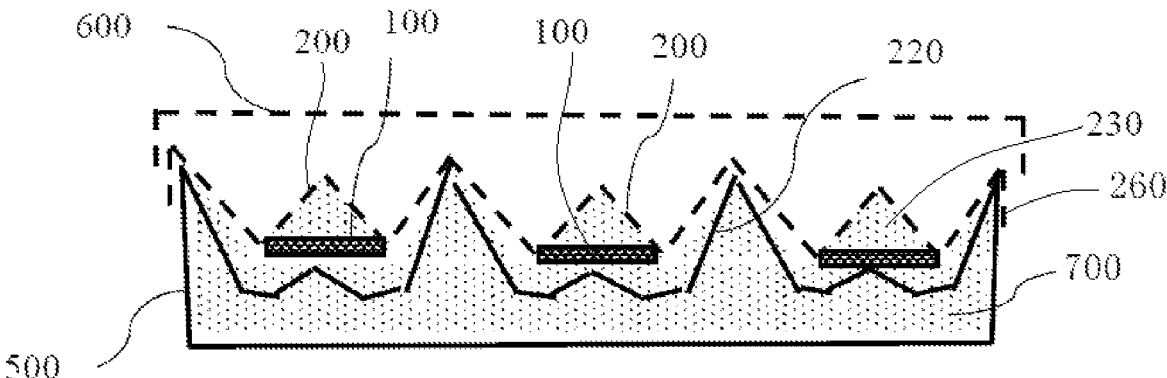
FIG. 6 is a schematic diagram of a vertical cross-section of a combined structure of a solar energy utilization apparatus in an embodiment of the present disclosure.

Referring to FIG. 6, a solar energy utilization apparatus disclosed in this embodiment may demonstrate the application of the solar energy utilization apparatus shown in the above embodiments.

The combined structure may include a storage container 500 and at least two solar energy utilization apparatus as shown in any of the above embodiments. The solar energy utilization apparatus may be placed flat inside the storage container 500, which is filled with a working fluid 700 that is in contact with the solar energy utilization apparatus to cool and recycle them.

Referring to FIG. 6, taking three solar energy utilization apparatus arranged in an array structure in parallel as an example. In this embodiment, a plurality of transparent top covers 210 are connected together and can be processed and formed at one time. Similarly, a plurality of reflection grooves 220 are also connected together and can be processed and formed at one time.

In order to protect the solar energy utilization apparatus to achieve dustproof, waterproof, and pollution prevention, in one embodiment, a dust cover 600 may also be included, which is placed on the storage container 500 to cover the solar energy utilization apparatus.

In one embodiment, the three solar energy utilization apparatus share a storage container 500 and a dust cover 600.

In one embodiment, the storage container 500 and three transparent top covers 210 form a closed container, in which the transparent liquid 230 is provided. In this embodiment, the reflection groove 220 is immersed in the closed container.

In other embodiments, the storage container 500 and the reflection groove 220 can form a closed container, in which a working medium 700 for heat utilization can be provided. In this case, the working medium 700 can be different from the transparent liquid 230.

The above specific examples are set forth to aid in understanding the present disclosure and are not intended to limit the present disclosure. Variations of those specific embodiments may become apparent to those skilled in the art in light of the teachings herein.

The invention claimed is:

1. A solar energy utilization apparatus, comprising a light energy utilization unit and a liquid light-condensing lens, wherein, the liquid light-condensing lens comprises:

a transparent top cover being integrally recessed inward to form a first transparent part, and a middle area of the first transparent part protrudes upwards to form a second transparent part, and a reflection groove forming a chamber together with the transparent top cover, the chamber forming at least one liquid light-condensing cavity therein filled with a transparent liquid, the reflection groove having a reflecting surface facing towards the transparent top cover to reflect sunlight;

the light energy utilization unit has a light energy utilization part capable of receiving, converting and utilizing sunlight, and is arranged inside the liquid light-condensing cavity, outside the liquid light-condensing cavity or formed as a wall of the liquid light-condensing cavity to receive and utilize the sunlight;

the transparent top cover is made of a transparent material capable of refracting sunlight from outside to inside the liquid light-condensing cavity, and the liquid light-condensing cavity forms a structure capable of allowing at least a part of the sunlight that is emitted from the transparent liquid to an inner wall of the liquid light-condensing cavity to form a total reflection phenomenon so as to concentrate the sunlight onto the light energy utilization part;

wherein the transparent top cover and the reflection groove are arranged in a barrel-shaped structure around a vertical centerline of the second transparent part; and wherein the transparent top cover is roughly W-shaped in a vertical cross-section of the transparent top cover and the reflection groove, a middle convex region of the W-shaped corresponds to the second transparent part, and regions of both sides of the second transparent part correspond to the first transparent part.

2. The solar energy utilization apparatus according to claim 1, wherein the reflection groove is roughly W-shaped in the vertical cross-section of the transparent top cover and the reflection groove, a middle convex part of the reflection groove is arranged corresponding to a middle convex part of the transparent top cover.

3. The solar energy utilization apparatus according to claim 1, wherein, in the solar energy utilization apparatus, the chamber is divided into at least a liquid light-condensing cavity and at least an empty cavity by a transparent partition wall and/or the light energy utilization unit, so as to guide sunlight to the light energy utilization unit.

4. The solar energy utilization apparatus according to claim 3, wherein the liquid light-condensing cavity comprises a middle liquid light-condensing cavity arranged at the second transparent part and at least a left liquid light-condensing cavity and at least a right liquid light-condensing cavity that are arranged at both sides of the middle liquid light-condensing cavity; at least an empty cavity is arranged below the middle liquid light-condensing cavity and arranged at the middle of the left liquid light-condensing cavity and the right liquid light-condensing cavity; the light energy utilization unit is arranged at an outer side of a bottom wall of the middle liquid light-condensing cavity or forms as the bottom wall of the middle liquid light-condensing cavity, and the light energy utilization part has a first light energy utilization part and a second light energy utilization part that are arranged oppositely, wherein the first light energy utilization part is arranged towards the middle liquid light- condensing cavity and the second light energy utilization part is arranged towards the empty cavity.

5. The solar energy utilization apparatus according to claim 4, wherein the left liquid light-condensing cavity and the right liquid light-condensing cavity are arranged symmetrically relative to the middle liquid light-condensing cavity.

6. The solar energy utilization apparatus according to claim 3, wherein the empty cavity is arranged below the second transparent part, and the light energy utilization unit is arranged below the empty cavity.

7. The solar energy utilization apparatus according to claim 3, wherein there are two or more liquid light-condensing cavities, wherein some or all of the liquid light-condensing cavities are sealed and separated from each other, and the sealed and separated liquid light-condensing cavities are filled with a same or different transparent liquid respectively.

8. A combined structure of the solar energy utilization apparatus, comprising a storage container and at least two solar energy utilization apparatus according to claim 1, the solar energy utilization apparatus is placed flat inside the storage container provided with a working medium inside, the working medium is in contact with the solar energy utilization apparatus for cooling the solar energy utilization apparatus and recycling heat emitted by the solar energy utilization apparatus.

* * * * *